(No Model.) 4 Sheets—Sheet 1.
J. FLATHER.
MACHINE FOR TURNING AND GRINDING TAPERS.
No. 396,077. Patented Jan. 15, 1889.
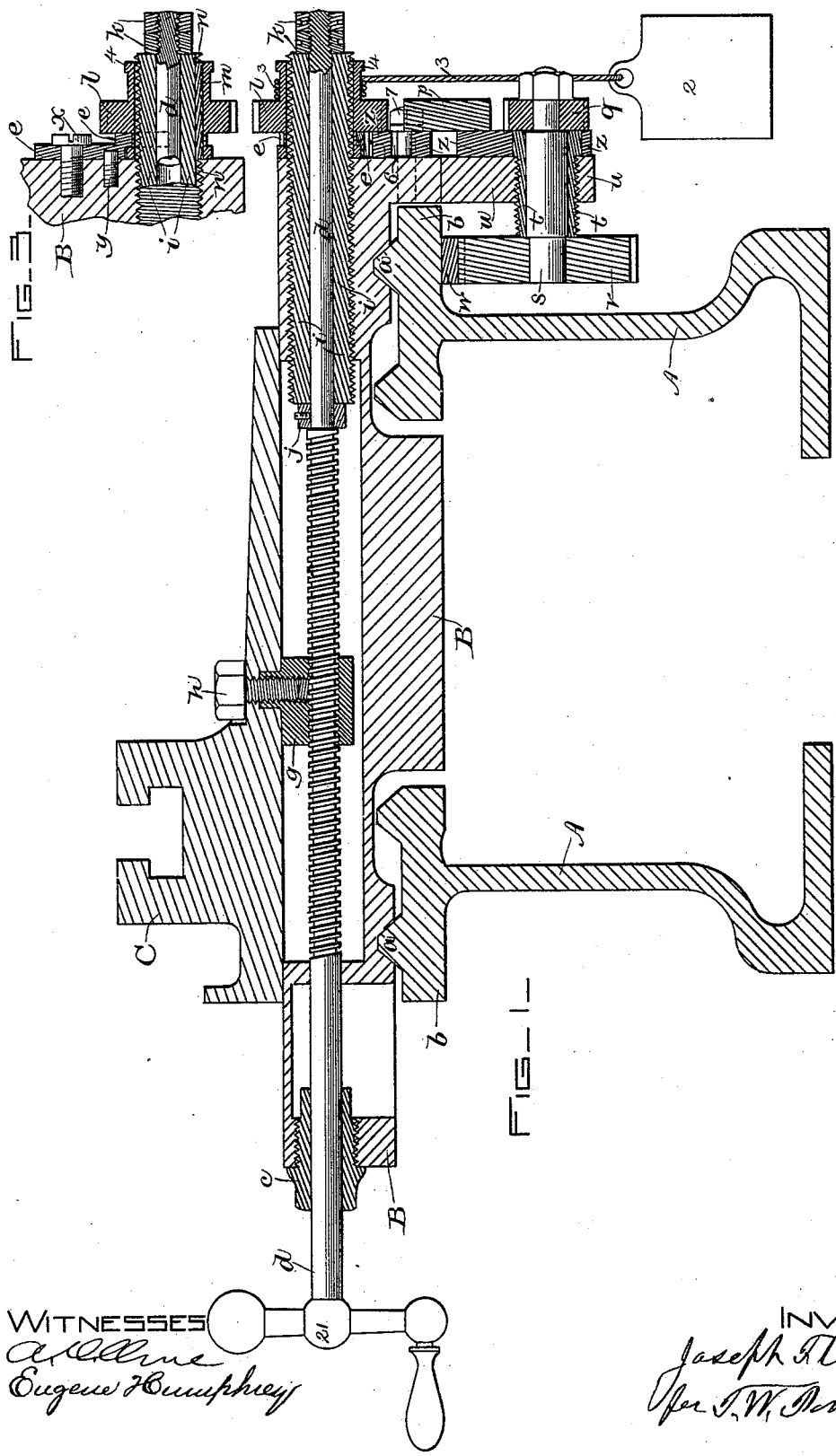
WITNESSES
INVENTOR
Joseph Flather
per J. W. Porter, Atty (No Model.) 4 Sheets—Sheet 2.
J. FLATHER.
MACHINE FOR TURNING AND GRINDING TAPERS.
No. 396,077. Patented Jan. 15, 1889.
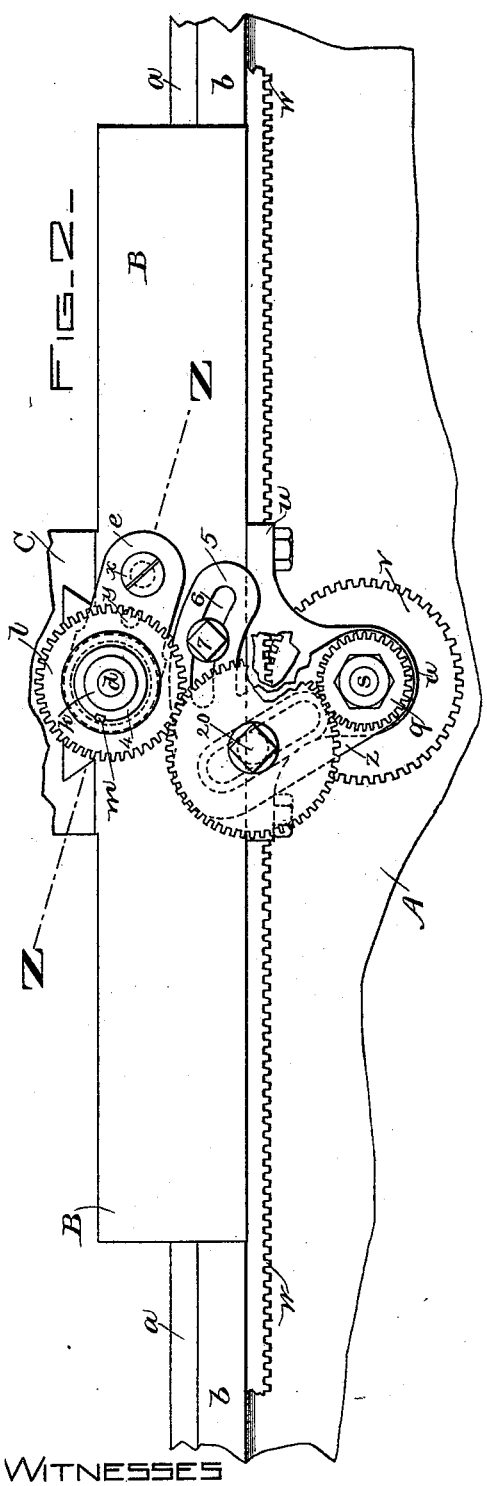
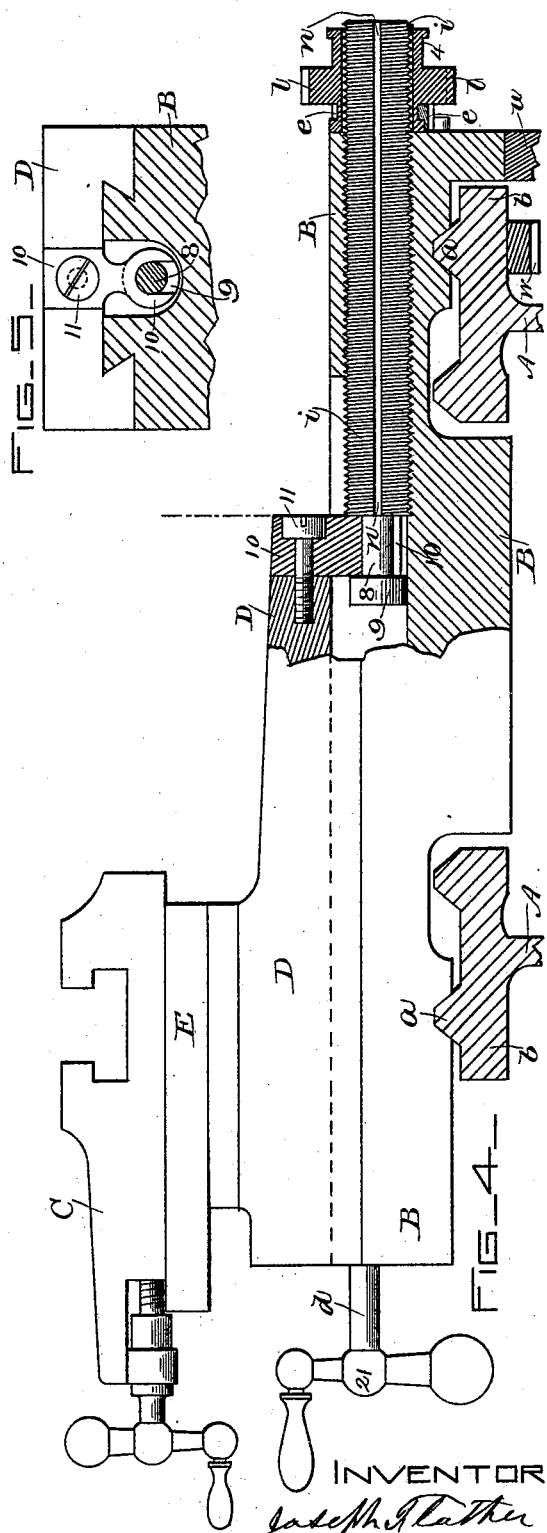
WITNESSES
All Crane
Eugene Humphrey
INVENTOR
Joseph Flather
per T. W. Porter Atty

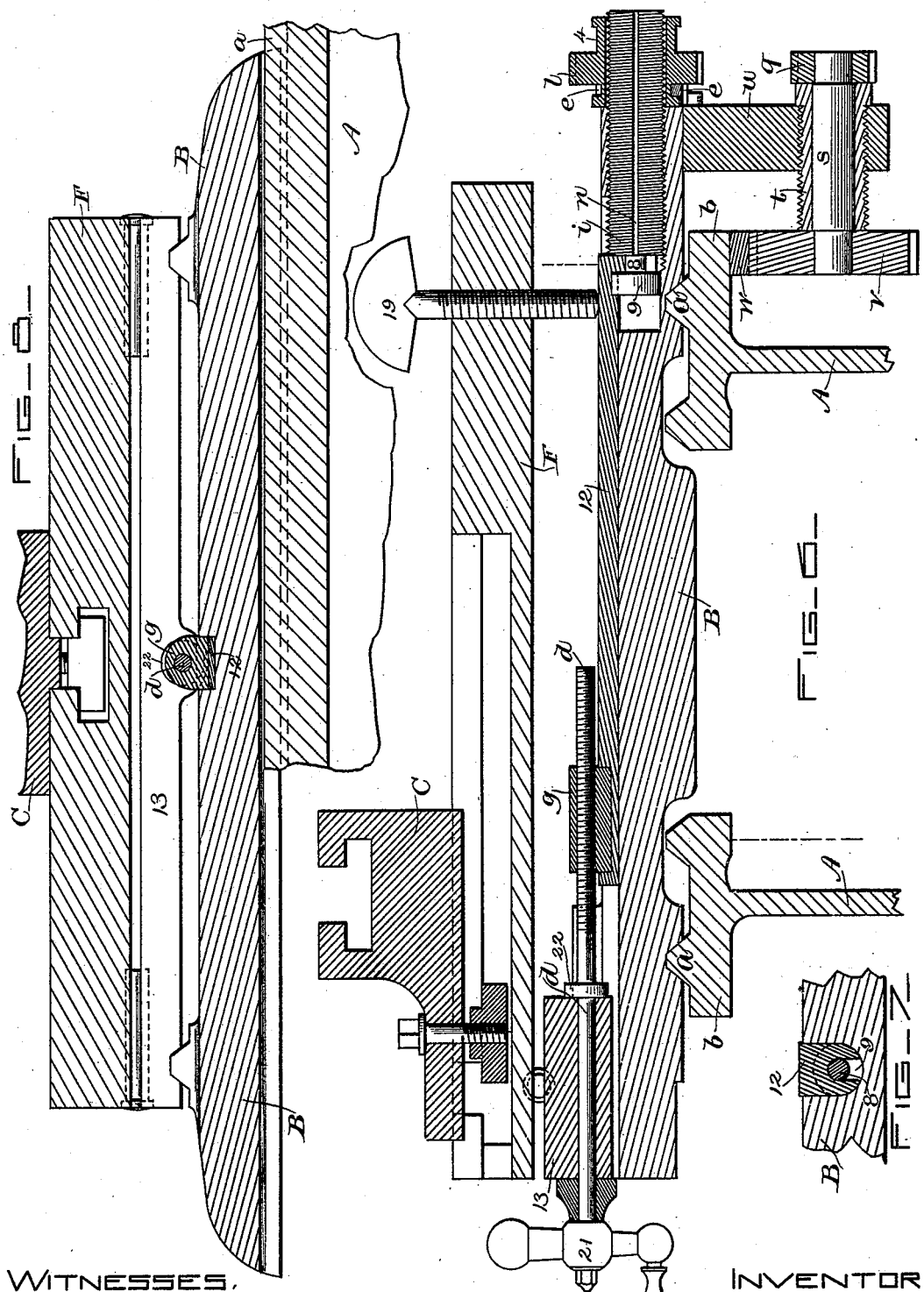

(No Model.) 4 Sheets—Sheet 4.
J. FLATHER.
MACHINE FOR TURNING AND GRINDING TAPERS.
No. 396,077. Patented Jan. 15, 1889.

WITNESSES.
INVENTOR
Joseph Flather
Jno. T. W. Porter, Atty.

UNITED STATES PATENT OFFICE.

JOSEPH FLATHER, OF NASHUA, NEW HAMPSHIRE.

MACHINE FOR TURNING AND GRINDING TAPERS.

SPECIFICATION forming part of Letters Patent No. 396,077, dated January 15, 1889.

Application filed July 25, 1888. Serial No. 280,983. (No model.)

*To all whom it may concern:*

Be it known that I, JOSEPH FLATHER, of Nashua, in the county of Hillsborough and State of New Hampshire, have invented a new and useful Improvement in Machines for Turning and Grinding Tapers, which will, in connection with the accompanying drawings, be hereinafter fully described, and specifically defined in the appended claims.

Figure 9:
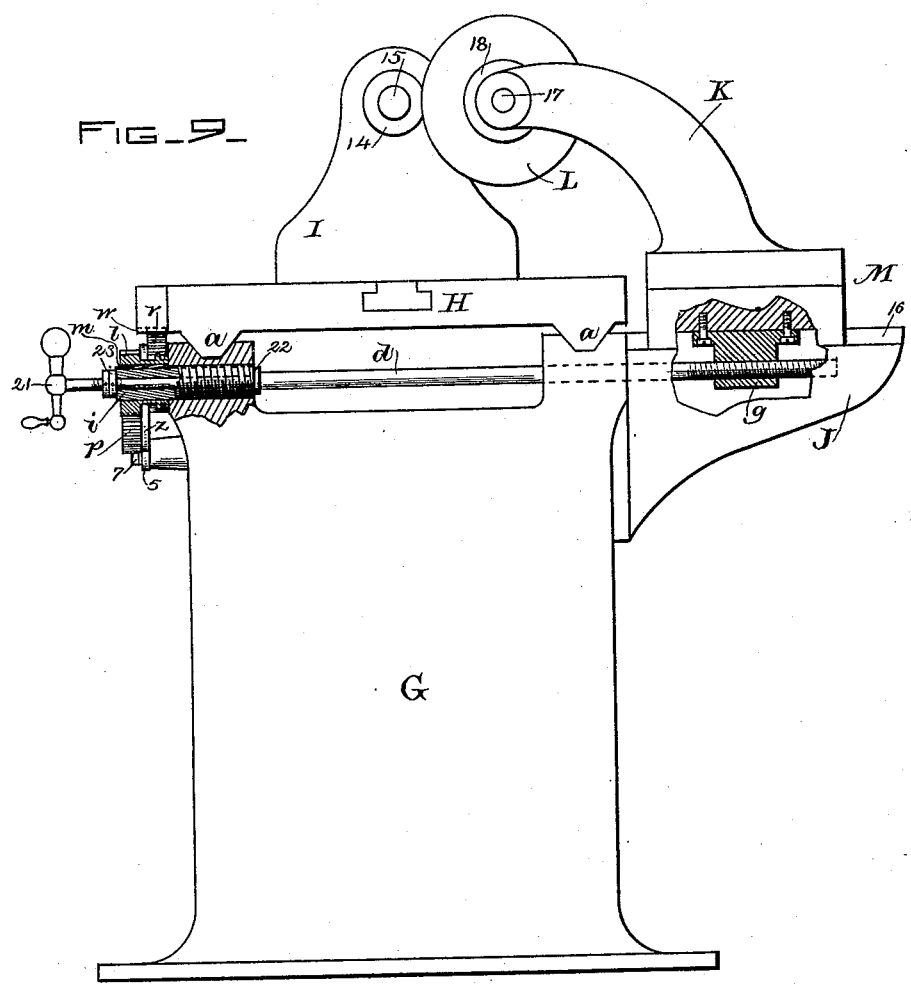
Figure 10:
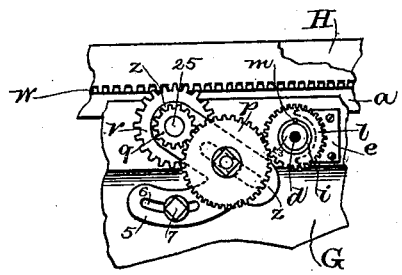

In said drawings, Figure 1 is a vertical section taken transversely through the bed, the carriage, and the tool-post slide of a lathe embodying my invention. Fig. 2 is a detached elevation taken as at the right of Fig. 1, and showing additional parts that coact with what is shown in Fig. 1. Fig. 3 is an oblique section taken on line Z Z, Fig. 2, and showing details of parts shown in Figs. 1 and 2. Fig. 4 is a sectional elevation, the section being taken at the same point as in Fig. 1, and the figure showing my invention as applied to a lathe having a "compound" rest. Fig. 5 is a detached elevation taken as viewed from the right in Fig. 4. Fig. 6 is a view similar to Fig. 1, but representing my invention as applied to a lathe having a "weighted" carriage. Figs. 7 and 8 show details of parts shown in Fig. 6. Fig. 9 is an elevation taken at the right of a metal-grinding machine embodying my invention, certain of the parts being shown in vertical section. Fig. 10 is a detached elevation viewed as at the front (the left) in Fig. 9, and showing certain of the parts.

This invention relates to metal-reducing machines—such as engine-lathes and grinding-machines—and the object sought is a machine to produce tapering forms; and the invention consists in combining a screw-feed mechanism arranged to move the tool-support transversely to the axis of the lathe-bed, a gear mechanism engaged with and arranged to actuate said screw-feed mechanism, and a rack secured to the bed and engaged with and arranged to actuate said gear mechanism as the tool-support is, by the usual feed mechanism, moved along the bed in the longitudinal direction thereof, whereby the reducing-tool is, in a fixed and determinate ratio, constantly moved toward the axis of the body of metal being reduced as the reducing-tool is moved (by the usual feeding devices) in the lineal direction of said body.

My invention is practically carried into effect by the mechanism shown in said drawings, which I will now proceed to particularly describe.

The bed of the lathe is shown in cross-section at A, while B represents the carriage fitted to move lengthwise of the bed on the beveled ways or bearings $a\ a$, the carriage being thus moved or "fed" by any of the various known feeding devices.

C represents the tool-post slide, which may be mounted directly upon carriage B, as shown in Fig. 1, or it may be mounted to slide in and out upon a turn-table, E, Fig. 4, which is mounted upon slide D, arranged to slide in and out upon the carriage B, or it may be supported upon the plate F, Fig. 6, vertically adjustable by screw 19, and at its front end pivotally supported upon plate 13, arranged to slide transversely to the lathe-bed on the carriage, each of said constructions and arrangements of parts being old and well known.

The cross-feed screw $d$ is shown in Fig. 1 as journaled at its outer end in sleeve $c$, threaded in carriage B, and with its threaded portion engaging in nut $g$, secured by screw $h$ to the tool-post slide C, the rear end of screw $d$ being reduced to the base of its screw-threads, and is journaled in hollow screw $i$, which is threaded to rotate in carriage B, the screw $d$ being secured from lineal movement in the screw $i$ by set-collar $j$ and lock-nuts $k$.

It will be obvious that when screw $d$ is rotated and screw $i$ at rest slide C will be moved in or out, according to the direction in which the screw rotates, as the nut $g$ will travel along the screw, and thus move the slide; or if screw $i$ be rotated while screw $d$ is not rotated the slide C will be moved in or out, according to the direction in which said screw $i$ is rotated. It may be here stated that screw $d$ is rotated for the usual purposes of cross-feed by its crank 21, or otherwise; but to rotate screw $i$, and thereby constantly and gradually move the operating-tool supported by slide C toward or from the body revolving on the lathe-centers, and which said tool is reducing, I arrange the small gear $l$ upon the screw $i$, the two being interlocked to rotate together by spline *m*, which is seated in splineway *n* in the screw, Figs. 3 and 4, and in a corresponding slot in the gear, the gear having a long bearing or hub, so as to rest upon the thread of the screw. Said gear is held in position close to the rear face of bed A by the keeper *e*, which enters a groove in the hub of the gear and is secured to bed A by set-screw *x* and steady-pin *y*, Fig. 3. Gear *l* is driven by an adjustable intermediate gear, *p*, which is engaged with pinion *q*, secured on arbor *s*, journaled in sleeve *t*, that is threaded in and supported by hanger *u*, secured to carriage B, a gear, *v*, being secured upon the inner end of said arbor and engaging rack *w*, secured upon ledge *b* of the bed. Said intermediate gear, *p*, is journaled upon an adjustable stud, 20, secured in hanger *z*, that is pivoted upon sleeve *t*, so that gear *p* is always in mesh with pinion *q*. Said hanger *z* is formed with a curved slot, 6, Fig. 2, whose radius point is the axis of arbor *s*, a locking-screw, 7, serving as the means to lock or release said hanger when gear *p* is to be enmeshed with or disconnected from gear *l* on sleeve *t*.

It will be obvious that as carriage B is, by the usual feed-gear, moved along the bed on ways *a* the engagement of gear *v* with rack *w* will cause the rotation of said gear at a speed proportionate to the "feed" movement of the carriage, and the rotation of said gear *v* will, through arbor *s*, pinion *q*, intermediate gear, *p*, and gear *l*, be imparted to screw *i*, thereby turning the same and, through cross-feed screw *d*, constantly moving the tool-supporting slide C nearer to or farther from the axis of the body revolving upon the lathe-centers, and which is being reduced by the cutting-tool supported upon slide C and moved in the longitudinal direction of such body by the carriage, the carriage and tool moving in or out, according to the direction in which screw *i* is rotated. It will also be obvious that by varying the relative diameters of gears *l q* the cross-feed movement of the reducing-tool may be varied relatively to the movement of carriage B along the bed, and hence any determinate taper may be automatically produced by said two feeds, and, further, that with screw *i* threaded right-handed, as shown, and with the cross-feed gears, as shown, the cutting-tool would by the usual feeding action of the lathe be moved toward the axis of the body being reduced, but that if said screw *i* was "left-hand" threaded, or an additional intermediate gear was employed in the train, then the cross-feed would be away from instead of toward the axis of the body revolving on the lathe-centers.

When the intermediate slide, D, is employed, as shown in Fig. 4, the screw *i* need not be hollow, as in Fig. 1, but formed with a neck, *g*, and head *h* at its inner end, while a forked yoke, 10, engages said neck and head, and is secured by screw 11 to the end of said slide D, whereby the slide is directly moved in or out by the rotation of the screw *i*, which latter is automatically rotated by a train of gears and rack, the same as already described with reference to Figs. 1 and 2 and as there shown; and, further, when the construction shown in said Fig. 4 is employed and it is desired to actuate slide D through the usual screw, *d*, then, by removing screw 11 and disconnecting yoke 10 from the slide, the latter is free from screw *i* and may be actuated by the screw *d* in the usual manner.

When the carriage shown in Fig. 6 is employed, which, as stated, is of the "weighted" pattern, the nut *g* of screw *d* is interlocked in a bar, 12, seated in carriage B, (see Figs. 6 and 8,) and the rear end of said bar is forked and has the same connection with screw *i* as is shown in Figs. 5 and 7 and as has just been described with reference to Fig. 4; and, further, when the construction shown in said Fig. 6 is employed, the screw *d* is journaled in slide 13, and is secured from lineal movement therein by the crank 21 and set-collar 22. Said slide 13 is interlocked with and arranged to slide on carriage B, while the vertically-tilting top F is at its front end pivoted upon slide 13 and carries the tool-post slide C in the usual manner.

It will be obvious that with the construction shown in Fig. 6, when screw *i* is quiescent and screw *d* is rotated, the slide 13 and parts thereby supported will be moved transversely to bed A, while if screw *i* is rotated the slide 13 and parts by it supported will, through bar 12 and screw *d*, be moved in the same manner as when screw *d* is rotated; and as screw *i* is connected with rack *w* by a train of gears in the same manner as in Figs. 1 and 4, therefore the movement of the tool (carried by slide C) toward or from the axis of the body being reduced by the cutting-tool will be in a positive ratio to the movement of the carriage B along bed A, and thus said body may be turned to any required taper by properly proportioning the gears that rotate said screw *i*.

As hereinbefore stated, my invention is shown in Figs. 9 and 10 as applied to a machine adapted to reduce metallic bodies to a circular cross-section by the abrading action of an emery-wheel, and in Fig. 9 G represents the frame or standard on which the operative parts are mounted. Said standard is provided with an arm, J, having a "dovetail" guideway, 16, to which is fitted the plate M to move closely but freely thereon, and from said base rises the arm K, preferably forked and having journaled in it the arbor 17, provided with pulley 18, by a belt on which rotary motion may be imparted to the arbor and the emery-wheel L, rigidly secured thereon.

A table, H, having ways *a*, is arranged to move in corresponding bearings on standard G. Upon said table a head and tail stock are secured, the tail-stock being adjustable in its distance from the head-stock to adapt them to longer or shorter bodies that are to be reduced. The head-stock is shown at I and has the arbor 14, provided with the center 15; but as all parts of the machine thus far pointed out are old, common, and well known, a further description thereof is not deemed necessary.

The threaded nut $g$ is secured to base M, and in this nut is threaded the screw $d$, which at its front end is journaled in screw $i$, and is therein secured from lineal displacement by solid collar 22 and set-collar 23. This screw $d$ may be actuated by means of hand-crank 21 to move wheel L toward or from the axis of the body being revolved upon the centers of the machine, or screw $i$ may be automatically rotated, as table H moves lineally, by means of gears, as follows, to wit: Gear $l$, secured on screw $i$, as already described in reference to Fig. 1, is engaged by intermediate gear, $p$, pivoted on hanger $z$, said gear $p$ being driven by pinion $q$, secured on shaft 25, which also carries gear $v$, that engages rack $w$ on table H, which rack serves to actuate the gears, the shaft 25 being journaled in standard G. It being obvious that as the lineal movement of table H serves, through the described rack and gears, to rotate screw $i$, and thereby lineally move screw $d$, thus moving wheel L toward or from the axis of the body supported upon the centers of the stocks I in a fixed and positive ratio or relation to the movement of said body past the wheel, therefore by changing the relative proportions of gears $l$ and $q$, or of $l$, $q$, and $v$, the degree of the taper may be varied, as desired. It will also be seen that in the machine shown in Figs. 9 and 10 there is an obvious reversal merely of the means of bringing the reducing-tool (the abrading-wheel L) in contact with the entire length of the body being reduced, for while in the other views the mechanism is adapted to move the reducing-tool along the length of the body to be reduced, in Figs. 9 and 10 said body moves relatively to said wheel L.

My invention is equally adapted to forming tapering passages in bodies of metal, as to forming bodies having a cylindrical exterior, it being only necessary to secure in the tool-post of the lathe a tool adapted to act upon the interior wall of a hollow body, and in such manner a socket or hole may be formed to exactly fit a solid body turned in the same lathe with the same taper-producing devices.

When my invention is employed with a compound rest, such as is shown in Fig. 4, the screws $d$ and $i$ may, if preferred, be directly connected together, as in Fig. 1, instead of by a yoke, as shown. Whenever it is desired to employ the lathe to produce cylindrical bodies or other usual forms, it is only requisite to disconnect gear $p$ from gear $l$ to render the automatic tapering mechanism inoperative, a suitable set-screw, pinching device, or other known means of rigidly locking screw $i$ being provided to secure it in such case from rotation.

It will be obvious that many changes may be made in the details and construction of parts employed in my invention without departing from the substance thereof.

If there be any occasion to guard against "backlash" in the gears, I suspend a suitable weight, 2, by a cord, 3, wound upon and secured to the hub 4 of gear $l$, as shown in Fig. 1.

I claim as my invention—

1. The combination of bed A, provided with rack $w$, saddle B, arranged to move on ways $a$ and provided with tool-post slide C, screws $d\ i$, having independent rotative action, but secured from relative lineal displacement, a threaded connection between screw $d$ and the tool-post slide, and a system of gearing connecting the rack with screw $i$, and through screw $d$ with tool-post slide C, whereby the lineal movement along bed A may impart a rotary movement to screw $i$ and a movement to screw $d$ and slide C transverse to said bed, substantially as specified.

2. The combination of bed A, its rack $w$, saddle B, tool-post slide C, screws $d\ i$, and a train of gears engaging said rack and screw $i$, all arranged to operate substantially as specified.

3. The combination, with the tool-support of a metal-turning lathe, of the hollow screw $i$, the cross-feed screw $d$, journaled in and interlocked with said hollow screw, a rack, and the gear mechanism connected with said rack and hollow screw, all substantially as specified.

JOSEPH FLATHER.

Witnesses:
  EUGENE HUMPHREY,
  T. W. PORTER.